Dec. 27, 1938.  H. J. DILLON  2,141,267
VEHICLE
Filed Sept. 3, 1935  6 Sheets-Sheet 1
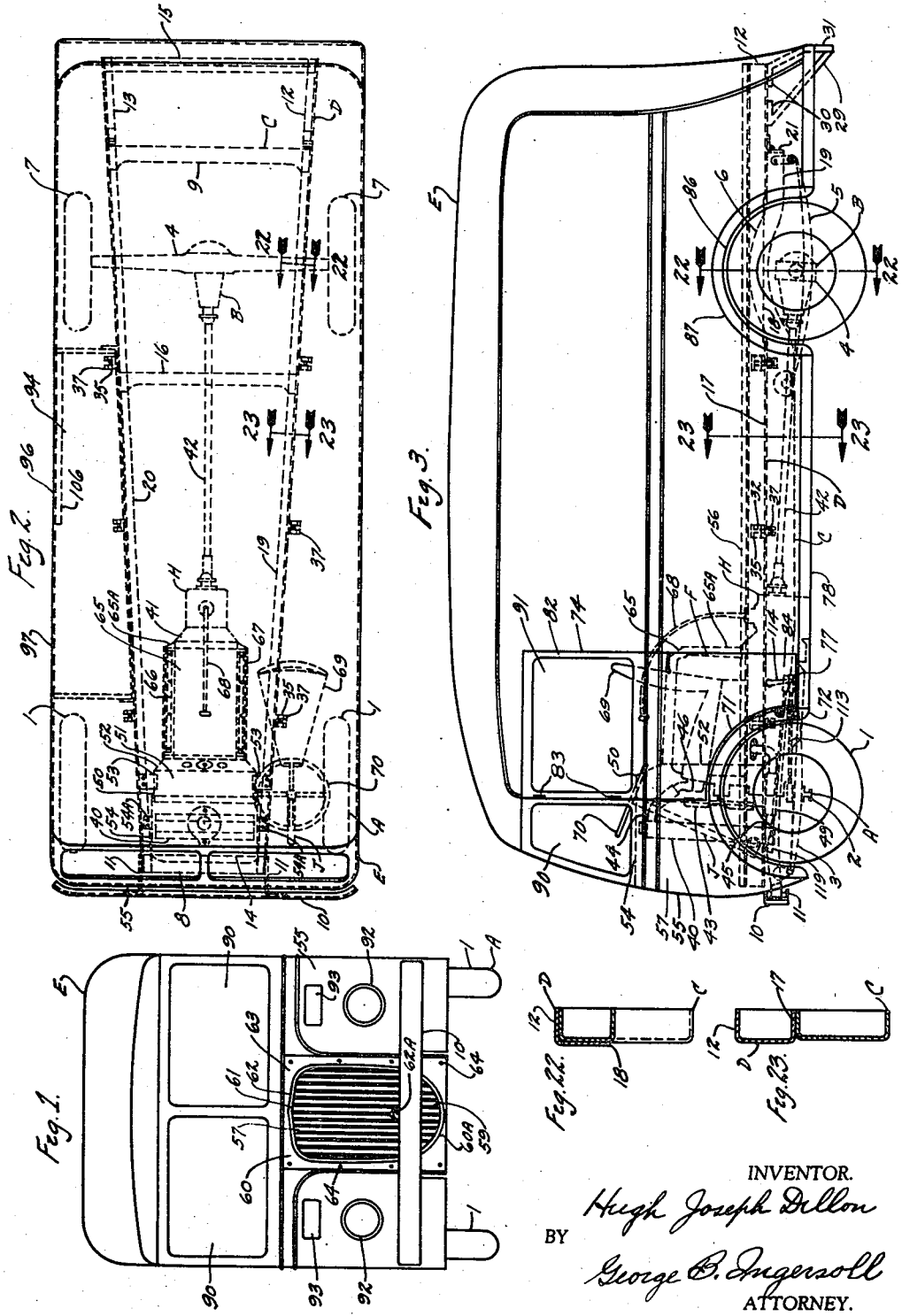
INVENTOR.
Hugh Joseph Dillon
BY
George B. Ingersoll
ATTORNEY.

Dec. 27, 1938.  H. J. DILLON  2,141,267
VEHICLE
Filed Sept. 3, 1935   6 Sheets-Sheet 2
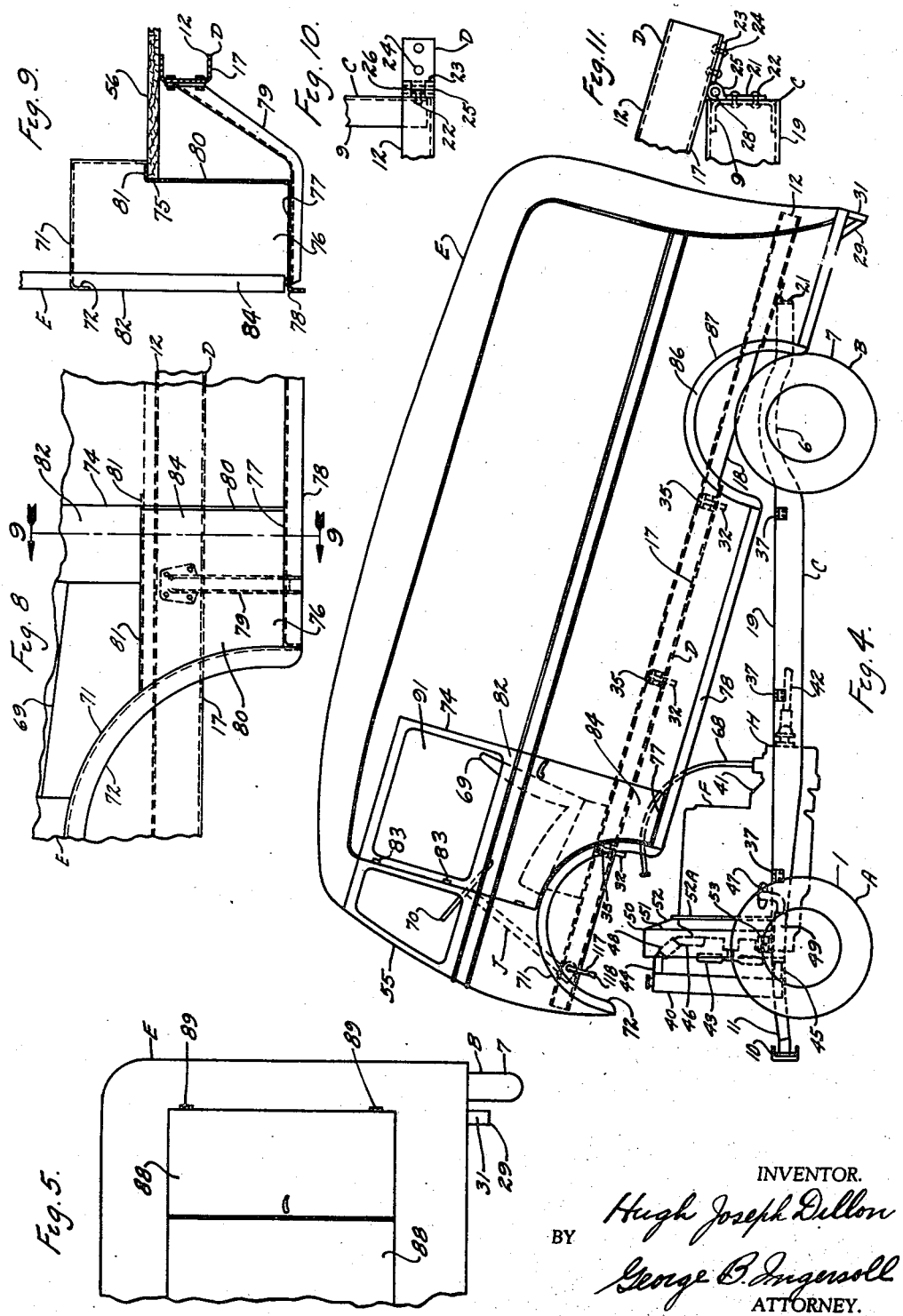
INVENTOR.
Hugh Joseph Dillon
BY
George B. Ingersoll
ATTORNEY.

Dec. 27, 1938.  H. J. DILLON  2,141,267
VEHICLE
Filed Sept. 3, 1935  6 Sheets-Sheet 3
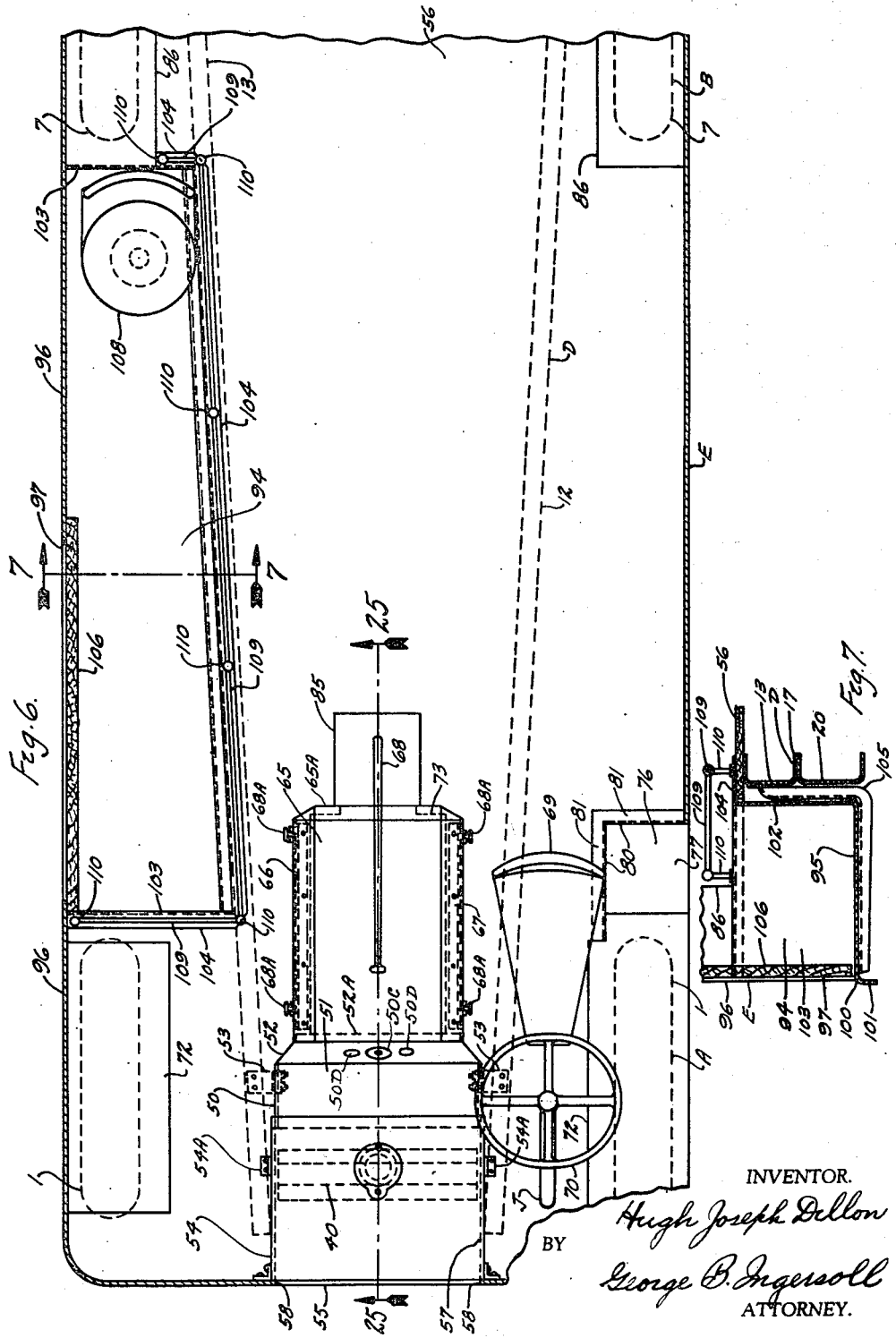
INVENTOR.
Hugh Joseph Dillon
BY
George B. Ingersoll
ATTORNEY.

Dec. 27, 1938.  H. J. DILLON  2,141,267
VEHICLE
Filed Sept. 3, 1935  6 Sheets-Sheet 4
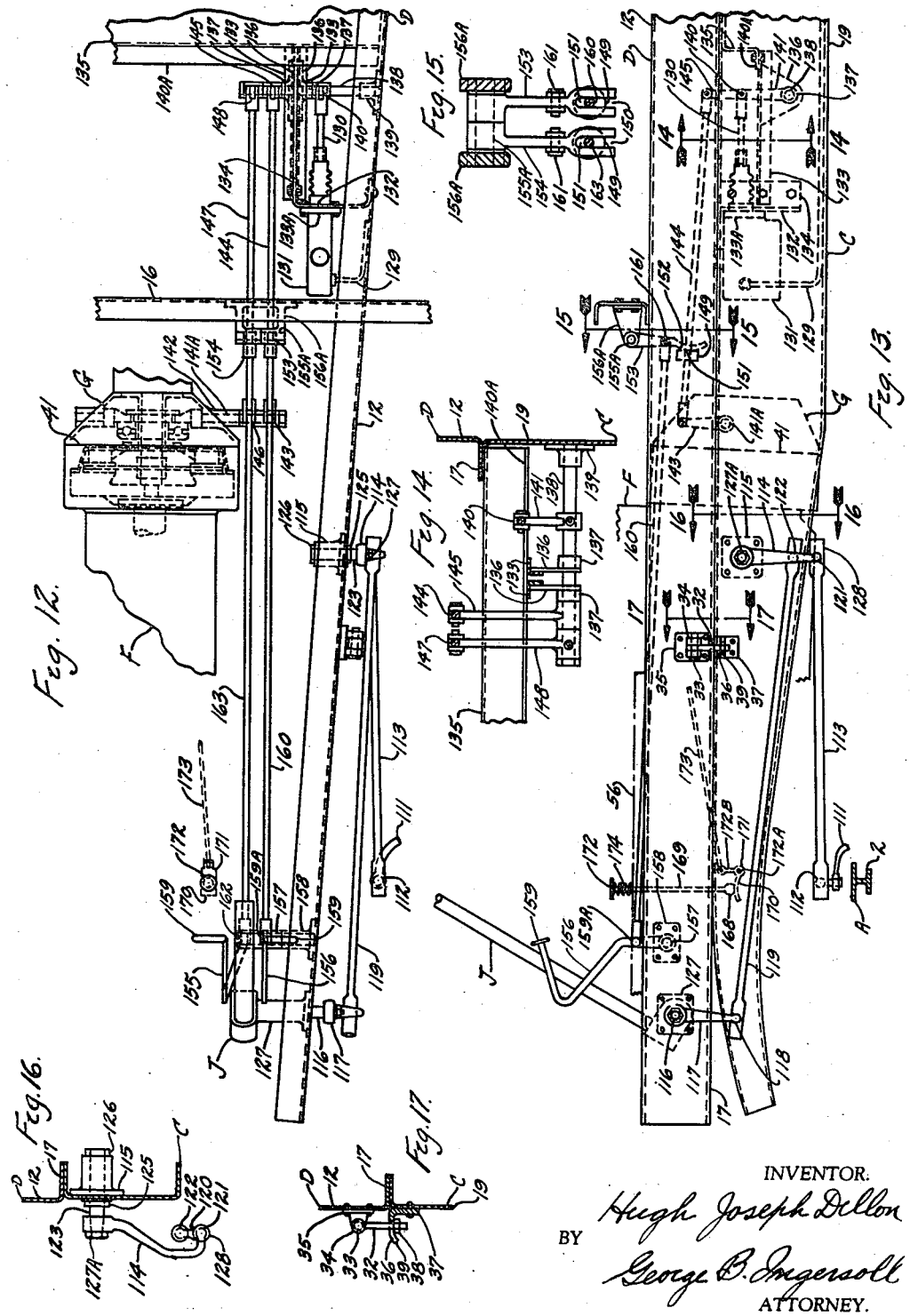
INVENTOR.
Hugh Joseph Dillon
BY George B. Ingersoll
ATTORNEY.

Dec. 27, 1938.  H. J. DILLON  2,141,267
VEHICLE
Filed Sept. 3, 1935  6 Sheets-Sheet 5
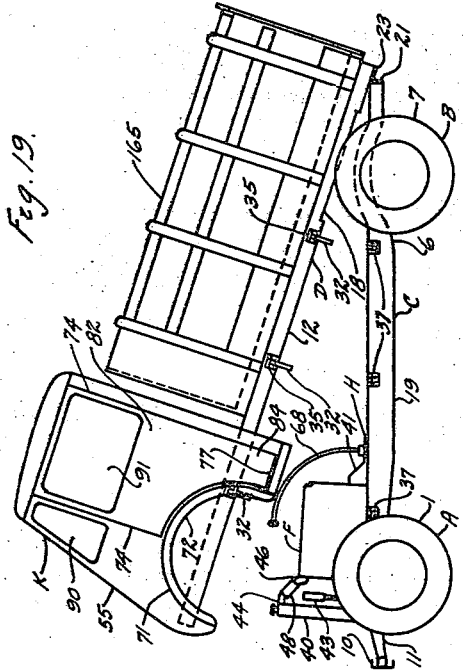
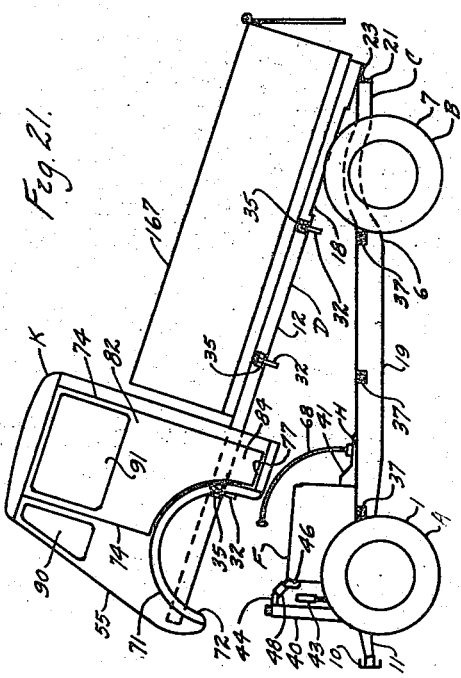
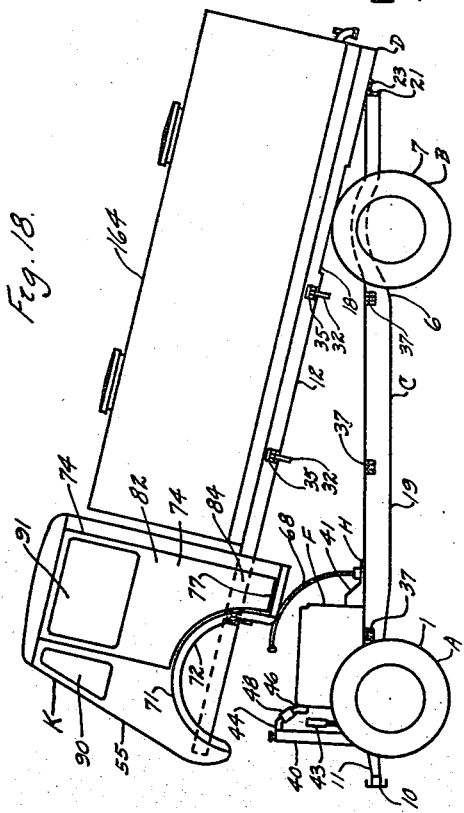
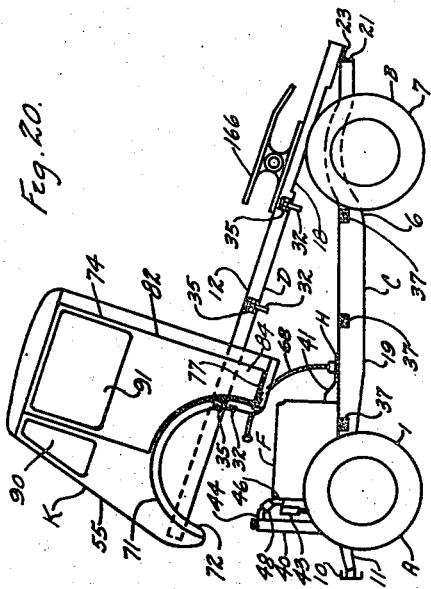
INVENTOR.
Hugh Joseph Dillon
BY
George B. Ingersoll
ATTORNEY.

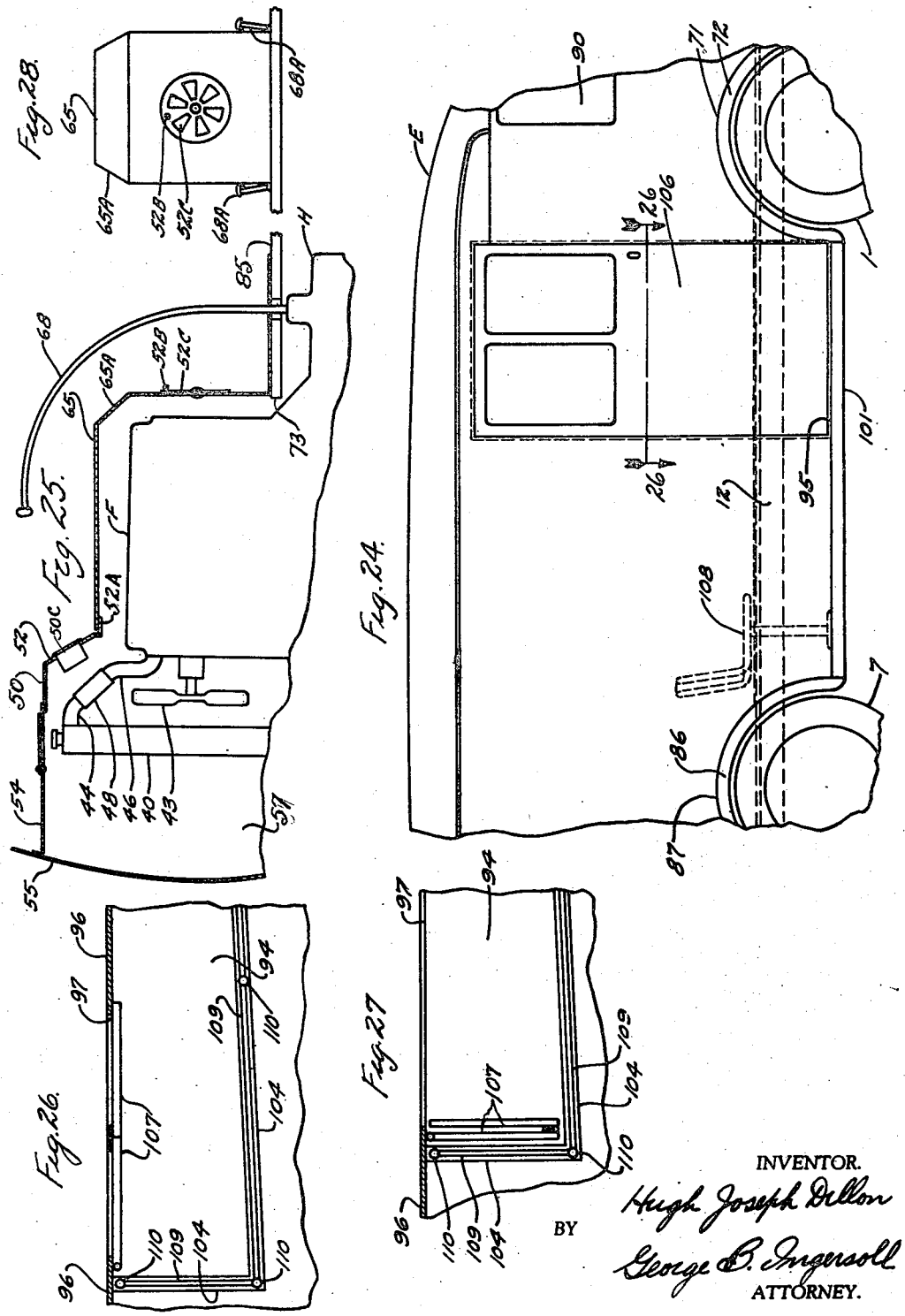

Patented Dec. 27, 1938

2,141,267

UNITED STATES PATENT OFFICE 2,141,267

VEHICLE

Hugh Joseph Dillon, Highland Park, Mich.

Application September 3, 1935, Serial No. 38,936

9 Claims. (Cl. 180—77)

My invention relates to improvements in a vehicle in which a body structure is pivotally mounted on a chassis structure and the objects of my improvements are, first, to provide a vehicle having a body structure movably connected to a chassis structure of the vehicle to permit the body structure to be swung to a position in which the main units of the vehicle chassis will be readily accessible for servicing and similar operations; second, to provide a vehicle having combined body and cab structure hinged at the rear of a chassis to permit the combined body and cab structure to be pivotally moved about the rear portion of the chassis to permit accessibility to the chassis parts; third, to provide a vehicle having a pivotally mounted body structure having vehicle control mechanism mounted thereon and adapted to automatically engage vehicle control mechanism mounted on the chassis when the body structure is lowered to its mounted position on the chassis, to permit ready movement of the body structure and its vehicle control mechanism to and from the vehicle control mechanism mounted on the chassis; fourth, to provide a vehicle having a pivotally mounted body structure having engine hood mechanism mounted thereon and adapted to automatically engage hood mechanism mounted on the chassis when the body structure is lowered to its mounted position on the chassis to permit ready movement of the body structure and its hood mechanism to and from the hood mechanism mounted on the chassis; fifth, to provide a vehicle having a frame assembly comprising a main frame assembly reinforced by auxiliary side frame members mounted on the main side frame members of the main frame assembly; sixth, to provide a vehicle having a main frame assembly reinforced by an auxiliary frame assembly hinged to the main frame assembly; seventh, to provide a vehicle having a main frame assembly having a kick up portion with an auxiliary frame assembly so mounted as to provide a straight upper supporting surface for mounting a body structure thereon; eighth, to provide a vehicle having a steering mechanism adapted for operation with a steering gear assembly located at one side of a steering axle with steering mechanism with means to permit the steering gear assembly to be located at the other side of the steering axle and to utilize the original steering geometry of the vehicle; ninth, to provide a vehicle having a body structure surrounding a radiator mechanism mounted on the vehicle chassis, together with a radiator grill means mounted on the body structure for association with the radiator mechanism; tenth, to provide a vehicle originally constructed with a cab structure located behind an engine with control mechanism operatively connected with the original control mechanism of the vehicle and permitting the mounting of a cab structure over the engine; eleventh, to provide a vehicle with a frame structure hinged on the vehicle chassis and supporting a fifth wheel mechanism; twelfth, to provide a vehicle body having an enclosed platform located below the level of the main floor portion of the vehicle body for use by a jumper operator on the vehicle; thirteenth, to provide a vehicle body having an enclosed platform located below the level of the main floor portion of the vehicle body and extending for a substantial distance rearwardly of a door opening into the enclosed platform; fourteenth, to provide a vehicle body having an enclosed platform located below the level of the main floor portion of the vehicle body and extending longitudinally thereadjacent for a substantial portion of the length of the vehicle body; fifteenth, to provide a vehicle body having an enclosed platform located below the level of the main floor of vehicle body with a seat mechanism for an operator utilizing the enclosed platform; sixteenth, to provide a vehicle body having a step opening closed by a swinging door; seventeenth, to provide a fully enclosed step platform having its outermost edge portions located substantially flush with the outside portion of a vehicle body; eighteenth, to provide a door located over and extending at the rear side of a fender of the vehicle to fully close a step opening or space located at the rear side of and extending over the fender; nineteenth, to provide a vehicle having a hinged frame member provided with bumper members extending thereunder and adjacent the rear end of a body supported on the hinged frame member; twentieth, to provide a vehicle body having a depressed platform located below the main floor level of the vehicle body with means for preventing goods stored on the main floor level of the vehicle body from falling onto said depressed platform; twenty-first, to provide a vehicle having clutch control mechanism mounted on a main frame assembly and adapted to be automatically engaged and disengaged by clutch control mechanism mounted on an auxiliary structure hinged to a main frame assembly of the vehicle; twenty-second, to provide a vehicle having a hydraulic brake cylinder, together with brake control mechanism connected therewith and adapted to be automatically engaged and disengaged by brake control mechanism mounted on an auxiliary structure hinged to a main frame assembly of the vehicle; twenty-third, to provide a vehicle having engine accelerator mechanism mounted on a main frame assembly and adapted to be automatically engaged and disengaged by a plunger control mechanism mounted on an auxiliary structure hinged to a main frame assembly of the vehicle; and twenty-fourth, to provide a steering mechanism for a vehicle and comprising a pair of drag link members having adjacent ends pivotally connected together and supported by a pivotally mounted lever member.

I attain these objects by the mechanism illustrated in the accompanying drawings, in which—

Figure 1 is a front view of the vehicle and body; Figure 2, a plan view of the vehicle and body; Figure 3, a side view of the vehicle and body; Figure 4, a side view of the vehicle with the body disclosed as having been pivotally moved upward to permit accessibility to the chassis of the vehicle; Figure 5, a partial rear end view of the vehicle and body; Figure 6, a plan view of the body on the chassis of the vehicle but with its roof portion removed to disclose the inside of the body and chassis more clearly; Figure 7, a partial sectional view through the depressed portion or platform of the body and a portion of the chassis adjacent thereto on the line 7—7, Figure 6, said sectional view not disclosing the seat structure 108; Figure 8, a partial side view of the left hand door of the cab portion of the body and a portion of the chassis adjacent thereto; Figure 9, a partial sectional view through the left hand door of the cab portion of the body and a portion of the chassis adjacent thereto on the line 9—9, Figure 8; Figure 10, a partial plan view of the end portion of the main frame assembly and the auxiliary frame hinged thereto; Figure 11, a side view of the frame and hinge mechanism disclosed in Figure 10; Figure 12, a partial plan view of the chassis of the vehicle disclosing a portion of the control mechanism of the body and chassis; Figure 13, a side view of the chassis and body and control mechanism disclosed in Figure 12; Figure 14, a partial sectional view of the chassis and control mechanism disclosed in Figure 13 and taken on the line 14—14, Figure 13; Figure 15, a partial sectional view of the control mechanism taken on the line 15—15, Figure 13; Figure 16, a partial sectional view of the chassis and disclosing a portion of the steering mechanism, said partial sectional view being taken on the line 16—16, Figure 13; Figure 17, a partial sectional view of the chassis disclosing the means for fastening the main frame and auxiliary frame members together, said partial sectional view being taken on the line 17—17, Figure 13; Figure 18, a side view of the vehicle with its body structure disclosed as having been pivotally moved upward to permit accessibility to the chassis, said body structure comprising a cab together with a tank body mounted on the hinged frame structure of the vehicle; Figure 19, a side view of the vehicle with its body structure disclosed as having been pivotally moved upward to permit accessibility to the chassis, said body structure comprising a cab together with a stake body mounted on the hinged frame structure of the vehicle; Figure 20, a side view of the vehicle with its body structure disclosed as having been pivotally moved upward to permit accessibitly to the chassis, said body structure comprising a cab together with a fifth wheel mechanism mounted on the hinged frame structure of the vehicle; Figure 21, a side view of the vehicle with its body structure disclosed as having been pivotally moved upward to permit accessibility to the chassis, said body structure comprising a cab together with a dump body mounted on the hinged frame structure of the vehicle; Figure 22, a sectional view through the side rails of the main and auxiliary frame assemblies, said sectional view being taken on the line 22—22, Figure 2; Figure 23, a sectional view through the side rails of the main and auxiliary frame assemblies, said sectional view being taken on the line 23—23, Figure 2; Figure 24, a partial side view of the body assembly E of the vehicle disclosing the door of the jumper compartment; Figure 25, a partial sectional view of the vehicle taken on the line 25—25, Figure 6; Figure 26, a partial sectional view of the body assembly when equipped with a folding door, said door being disclosed in a closed position, said sectional view being taken on the line 26—26, Figure 24; Figure 27, a partial sectional view of the body disclosing the folding doors in their open or folded positions, said partial sectional view being taken on the line 26—26, Figure 24; and Figure 28, an end view of the hood structure disclosed in Figure 25, together with a partial view of the body structure.

Similar numerals refer to similar parts througout the several views.

The chassis of the vehicle is provided with a front or steering axle assembly A and the driving axle assembly B. The front axle assembly A comprises the wheels 1, together with the axle beam 2, upon which are mounted and supported the front springs 3, which are pivotally connected and shackled to the front end portion of the main frame assembly C. The rear axle assembly B comprises the wheels 7 with the housing 4 on which are mounted and supported the rear springs 5, which are pivotally connected and shackled to the rear end portion of the main frame assembly C. The main frame assembly C is disclosed as being of a design and construction as is conventionally installed in a vehicle chassis as original equipment and is thus utilized as the main frame assembly in a great number of so called light and medium duty truck vehicles, the main frame assembly C being conventionally provided with a kick up portion 6, which extends over and clears the outer end portions of the housing 4 of the rear axle assembly B.

It is also to be noted that said light and medium duty truck vehicles have been conventionally equipped heretofore with cabs of ordinary design and located behind or at the rear portions of the engine assembly with which the vehicle is equipped thus losing and wasting a considerable portion of the length of the vehicle for supporting and housing the goods or products which are to be transported. My invention is adapted for use with vehicles of substantially any design and it is to be noted that my invention is particularly adapted for use in converting the chassis of light and medium duty vehicles to chassis of heavier load capacities and also to permit bodies to be constructed for and installed thereon with cabs located over the power plant or engine assemblies, thus not only increasing the load capacities of the so-called light and medium duty truck vehicles to greater or heavier load capacity vehicles but also greatly increasing the cubic displacement of the body of the vehicle. Also, by further installing axles and tires of various capacities under the same chassis, a wide range of load capacities and displacements are rendered available for use on and with the major units or parts of so-called light and medium duty vehicles, which not only provides ideal truck equipment for the greater number of users of truck vehicles, but is especially adapted to many special kinds of transportation, such as department store and similar truck service where the units or packages carried are relatively light and bulky. Also, these advantages are obtained by minimum initial and servicing investments because the so-called standard light and medium duty truck vehicles are the lowest priced vehicles and due to my invention may be easily converted and transformed into heavier duty truck vehicles with a minimum of cost.

The main frame assembly C is provided with one or more cross members 8 at its front end portion and with one or more cross members 9 at its rear end portion, together with a bumper member 10 supported by the brackets 11 secured to the front end of the frame assembly C.

In order to provide greater frame assembly load carrying capacity as well as rigidity to support and accommodate greater load capacities and bulks and as well to provide a straight and even supporting surface for the body and cab structures above, the kick up portion 6 and the remaining portions of the main frame assembly C and also to provide a hinged support for the body and cab structures, I provide the auxiliary frame assembly D comprising the frame side rails 12 and 13 together with a suitable number of cross bars or members 14, 15 and 16. The frame side rails 12 and 13 have their lower flanges 17 cut away, as at 18, to permit the frame side rails 12 and 13 to fit down over and around the kick up portions 6 of the frame side rails 19 and 20 of the main frame assembly C, the frame side rails 12 and 13 extending along and on top of the frame side rails 19 and 20 to substantially the front ends of the frame side rails 12 and 13 and of the vehicles, the frame side rails 12 and 13 extending beyond and overhanging the rear end portions of the frame side rails 19 and 20 substantially as disclosed in Figures 2 and 3, or when desired as disclosed in Figures 10 and 11.

The lower hinge members 21 are secured by the rivets 22 to the end portions of the main frame assembly C and the upper hinge members 23 are secured by the rivets 24 to the end portions of the auxiliary frame assembly D, the lower hinge members 21 being provided with forked boss portions 25 between which fit and operate the boss portions 26 of the upper hinge members and pivotally supporting and engaging the other of said hinge members to permit pivotal or hinged movement of the auxiliary frame assembly D relative to the main frame assembly C.

The frame assembly D is provided with the substantially triangularly shaped bumper member 29, which is provided with the flanges 30 for securement to the lower portions or sides of the side rails 12 and 13 of the auxiliary frame assembly D, the bumper members 29 each being provided with the bumper surface or portion 31, which is located adjacent the rearmost and lowermost portions of the body assembly E in a manner to provide bumper or bumperette protection for the body assembly E and the rear end of the chassis of the vehicle.

In order to secure the auxiliary frame assembly D to the main frame assembly C, the bolts 32 are pivotally mounted on the pin or shaft 33, which is supported in the jaws or forked bosses 34 of the brackets 35, which are secured to the frame side rails 12 and 13 of the auxiliary frame assembly D, the bolts 32 being adapted to extend between and engage the jaws or forked portions 36 of the brackets 37, which are secured to the frame side rails 19 and 20 of the main frame assembly C, the bolts 32 being secured to the brackets 37 by the nuts 38, the outer ends of the jaws or forked portions 36 of the brackets 37 being curved or bent downwardly at 39 to prevent accidental pivotal movement of the bolts 32 and nuts 38 from engagement with the jaws or forked portions 36 of the brackets 37.

The chassis of the vehicle is provided with the radiator 40, which is suitably supported on the main frame assembly C of the vehicle and is inclined upwardly and rearwardly to facilitate swinging the body assembly E thereover as more fully herinafter disclosed. The chassis is further provided with the engine assembly or power unit F, which is suitably supported by the main frame assembly C and is provided with the flywheel housing 41 in which is conventionally mounted a clutch mechanism G, which is driven by the engine assembly F and is further operatively connected with the transmission assembly H, which it drives and which is operatively connected with the driving mechanism of the rear axle assembly B by the propeller shaft mechanism 42. The engine assembly F is provided with and drives the fan assembly 43, which draws air through the radiator assembly 40, which is provided with the upper water connection 44 and the lower water connection 45, which are respectively connected to the outlet water connection 46 and the inlet water connection 47 of the engine assembly F by the rubber hoses 48 and 49.

The hood support structure 50 is provided with the hood portion 51, which is substantially of the shape of an inverted U and has a similar shaped portion 52 at its rear side, the portion 52, however, having an angular position wall extending from the outermost rear edge of the hood portion 51 inwardly to support the hood ledge 52A, which is also of the shape of an inverted U but considerably smaller in size than the hood portion 51. The hood structure 50 is fixedly supported by the main frame assembly C of the vehicle chassis and is provided with the angle iron members or brackets 53 for securing the hood structure 50 to the frame side rails 19 and 20 or other adjacent portions of the frame assembly C. The hood structure 50 is of relatively short length and is located over the front end portions of the engine assembly F and extends at the rear of the radiator assembly 40, thus leaving the greater portion of the engine assembly F exposed when the body assembly E or similar structures are pivotally raised above the engine assembly F as disclosed in Figures 4, 18, 19, 20 and 21, and as more fully described hereinafter. The inclined portion 52 of the hood structure 50 is provided with openings for receiving and supporting therein, instruments such as a speedometer 50C and gauges 50D.

The hood structure 54 is substantially of the shape of an inverted U and is fixedly supported by the front wall portion 55 and the main floor 56 of the body assembly E, the hood structure 54 being provided with the flanges or brackets 54A, which are attached to the main floor 56 of the body assembly E. The hood structure 54 is thus adapted to extend over and cover the radiator 40 and a portion of the enclosing walls of the chamber 57 which extends to and through the front wall portion 55 of the body assembly E, the front wall portion 55 of the body assembly E being provided with the opening 58 therethrough to permit air to flow into the chamber 57 and through the radiator assembly 40, the grill structure 62 extending across the front side of the opening 58 to protect the core portion of the radiator assembly 40 and at the same time to allow air to enter into the chamber 57. The grill structure 62 comprises a plurality of bars 59 secured to the panel or plate member 60, which is provided with an opening 61 to coincide with the opening 58, the ends of the bars 59 being covered by the molding 60A, which is secured to the panel member 63, which in turn is secured to the front wall portion 55 of the body assembly E by the bolts or studs 64.

The grill structure 62 is provided with the starting crank hole 62A, which permits a starting crank to be inserted therethrough and within the chamber 57 to start the engine assembly F.

The hood member 65 is of an inverted U shape and with its end portion 65A is supported on the frame members 66 and 67 and is removably connected with the frame members 66 and 67 by the latch mechanisms 8A, the frame members 66 and 67 being suitably secured to and supported on the main floor 56 of the body assembly E, the main floor 56 being provided with a suitable opening 73 for receiving the engine assembly F and adjacent units, which extend upward through the main floor 56. The hood member 65 is further supported at its front end on the hood ledge 52A of the hood structure 50. The transmission assembly H is provided with the gear shift lever 68 which is bent to extend forwardly to a position where its handle portion or end is positioned within reach of a driver or operator when seated on the seat structure 69, which is also located to the rear and adjacent the steering wheel 70 of the steering gear assembly J.

The body assembly E is provided with the wheel housings 71 in which are supported the fenders 72 which extend over the wheels 1 of the front axle assembly A and are located with their outer sides or edges positioned substantially flush with the sides of the body assembly E.

The fenders 72 thus extend into the interior of the cab portion at the front end of the body assembly E as disclosed in Figures 2, 3, 6, 8 and 9 or into the interior of the cab assemblies K where the cab portion of the vehicle is constructed as a separate unit relative to the remaining portions of the body structures.

The fenders 72 rest upon and are suitably secured to the main floor 56 of the body assembly E, the main floor 56 being provided with the openings 75 through which the fenders 72 extend.

The cab portion of the body assembly E and the cab assemblies K are provided with the door openings 74, which connect with the step space or opening 76, which has its floor or step surface 77 located below the main floor 56 and the frame assemblies C and D, and substantially at the bottom of the body assembly E, the floor of the step space or opening 76 being formed by the step or running board plates 78, which are mounted on and supported by the step bracket 79, which are secured to the frame side rails 12 and 13 of the frame assembly D, the step plates 78 being constructed with the wall portions 80, which extend upwardly to close the rear sides of the step openings 76, the wall portion 80 being provided with the flanges 81, which are secured to the main floor 56. The doors 82 are mounted on the hinges 83 at their forward edges and close the door openings 74, the doors 82 being provided with the extension portions 84 which fit within and close the step spaces or openings 76, the body assembly E and the cab assemblies K thus exposing no step plates or equivalent surfaces for unauthorized persons to mount upon the vehicle when in operation. The cab assemblies K may be provided with the doors 82 at each of its sides whereas the body assembly E is provided with only one of the doors 82, said door 82 of the body assembly E being disclosed as being located at the left hand side thereof.

The main floor 56 of the body assembly E is provided with the removable floor board 85 around the gear shift lever 68 and extending over the transmission assembly H to provide an opening, after the floor board 85 has been removed, together with the opening under the hood member 65 after removal thereof, which will enable the gear shift lever to pass through said openings when the body assembly E is moved on its hinges away from the chassis.

The body assembly E is provided with the rear fenders 86 mounted in the rear wheel housings 87 and extending over the rear wheels 7 in a manner similar to that of the front fenders 72. The body assembly E is further provided with the rear doors 88 mounted on the hinges 89.

The cab portion of the body assembly E and the cab assemblies K are provided with the windows or windshield 90, which are located substantially on a line with the windows 91 of the doors 82, together with the lamps 92 mounted in the front wall portion 55 and the ventilator mechanisms 93 mounted in the front wall portion 55 above the lamps 92 and on each side of the grill structure 62.

The body assembly E is provided with the platform or jumper operator's compartment 94 which is located on the right hand side of the body assembly E or at the opposite side if it is desired to have the door 82 located on the right hand side, the compartment 94 having its floor 95 located below the main floor 56 and below the frame side rails 12 and 13 and extending substantially from the rear end of the front fender 72 to the front end of the rear fender 86, the compartment 94 extending in width substantially from the inside surface of the side wall portion 96 of the body assembly E to the outer side surface of the frame side rails 13 and 20, which are tapered outwardly and rearwardly thus providing a greater width at the front end of the compartment 94 adjacent the door opening 97, which extends substantially from the rear end of the right front fender 72 to a point intermediate or substantially halfway between the rear end of said right front fender 72 and the rear end of the compartment 94, thus not only providing a step portion for an operator, such as a jumper, to mount into the compartment 94 through the door opening 97, but also provides an extended passage or runway to enable the jumper operator to place or remove packages, bundles, or freight units at the front end of the body assembly E adjacent the right front fender 72 or at the central portion of the main floor 56 extending longitudinally adjacent the compartment 94 as well as at the rear end of the main floor 56 adjacent and between the rear fenders 86 and the rear doors 88, thus providing ample platform space to enable the jumper operator to sort and care for the goods being transported and delivered and at the same time allow the jumper operator to be safely positioned and fully enclosed by the body assembly, thus preventing accidental displacement of the jumper operator from the compartment 94, while the vehicle is travelling as well as insuring that no unauthorized persons can enter the body assembly E. Also should other persons be authorized to enter the body assembly E or should the driver of the vehicle, who is normally seated on the seat structure 69, desire to leave the body assembly E through its right hand side, said persons or said driver may readily do this without interfering with the jumper operator or similar party who has plenty of room in the compartment 94 behind the rearmost side of the door opening 97. This arrangement is particularly advantageous for department store and similar types of transportation and delivery where a jumper operator is employed to sort and deliver the goods or packages in association with a driver operator who devotes his entire time and attention to the driving operation of the vehicle.

The floor 95 of the compartment 94 is formed by the support member 100 which has a portion of itself displaced to form the flange 101 extending longitudinally of and substantially flush with the door opening, the support member 100 being further displaced to form the side wall portion 102 and the end wall portions 103 for closing the sides and ends of the compartment 94, the support member 100 being further formed with the flanges 104 for resting upon and being secured to the upper surface of the main floor 56. The support member 100 is secured to and supported by a plurality of brackets 105, which extend thereunder and are secured to the frame side rails 12 of the frame assembly D. The door 106 closes the door opening 97 and is disclosed, in Figure 6, as a sliding door mounted on the inside of the wall portion 96 and adapted to move to the rear of the compartment 94 and parallel with the wall portion 96. Figure 26 discloses the door opening 97 as being closed by a folding door 107, which may fold adjacent the front end of the compartment 94, both of the doors 107 and 106 being readily operable from the inside of the compartment 94. The seat structure 108 is located at the rear end of the compartment 94 adjacent the front end of the right rear fender 86 and is mounted on the support member 100, thus permitting the jumper operator to be seated while in the body assembly E and in a position well to the rear of the door opening 97.

The rail or railing 109 extends around and adjacent the edge of the compartment 94 to maintain packages and the goods stored within the body assembly E from being displaced and tumbling into the compartment 94, said rail 109 being supported by a plurality of brackets 110, which are mounted on the flanges 104 of the support member 100 and are secured to the main floor 56 of the body assembly E.

The front axle assembly A is provided with a steering arm 111 operatively connected with and adapted to move the wheels 1 in their steering movement, the steering arm 111 being provided with the ball stud 112 fixedly supported therein and pivotally connected with the drag link 113 which is pivotally connected with the ball end 121 of the steering arm 114, which in a conventional vehicle having a cab mounted behind an engine assembly, is mounted on a steering gear assembly J, which thus would be mounted at the rear of the front axle assembly A and at the point where the bracket 115 is mounted on the frame side rail 19 of the main frame assembly C, as disclosed in Figures 12 and 13. In order to maintain the original steering geometry of the steering mechanism when I convert a conventional vehicle, having a cab located behind an engine assembly, to a vehicle having a cab assembly or a cab portion of a body mounted at the extreme front end of the vehicle and over the engine assembly as disclosed, I move the steering gear assembly J from a position behind the front or steering axle assembly A to the position as disclosed in Figures 12 and 13 in which the bracket 127 of the steering gear assembly J is located ahead or in front of the front axle assembly A and mounted on the frame side rail 12 of the auxiliary frame assembly D, the chuck shaft 116 of the steering gear assembly J extending through the frame side rail 12 and supporting the steering arm or lever 117, which is fixedly secured thereon and adapted to turn therewith, the steering arm 117 being provided with the ball end 118 which pivotally connects with and supports the front end of the drag link 119, which is pivotally connected with and supported on the ball end 122 of the stud or member 120, which is connected to and supported on the rear end portion 128 of the drag link 113. The steering arm 114 is substantially a duplicate of the steering arm 117 and by its supported ball ends 121 and 122 pivotally support the rear end portions of the drag links 113 and 119, the steering arm 114 being fixedly secured by the nut 127A and thus is mounted on and adapted to turn with the shaft 123, which is rotatably mounted in the bracket 115, which is supported on and secured to the frame side rail 12 at substantially the same place and in the same way that the bracket 127 of the steering gear assembly J was originally mounted on the frame side rail 12. The shaft 123 is retained longitudinally by the collars 125 and 126.

In order to further convert a conventional chassis having a cab mounted behind an engine assembly to a chassis having a cab mounted over an engine assembly as disclosed, I reverse the conventional position of the hydraulic cylinder 131, which is operatively connected with brake mechanism in the wheels 1 and 7 by the conducts 129, so that the thrust shaft 130 extends toward the rear of the vehicle instead of toward the front of the vehicle, the hydraulic cylinder 131 extending through a suitable opening in the bracket 132 and is secured thereto by the flange 133A of the hydraulic cylinder 131, the bracket 132 being secured to the frame side rail 12 of the frame assembly C at one end of the bracket 132 and is provided with the pair of angle members 133, which are secured on opposite sides of and to the flange 134 of the bracket 132, the angle members 133 being suitably secured to the flange 140A of the frame cross members 135. The brackets 136 are each attached on one of the flanges of one of the angle members 133 and are each provided with a boss 137 which forms a bearing for rotatably supporting the shaft 138, which is further supported by the bracket 139 secured to the frame side rail 12 of frame assembly C.

The thrust shaft 130 is pivotally connected to the boss 140 of the lever member 141, which is fixedly secured to the shaft 138 and adapted to turn therewith.

The clutch mechanism G operatively mounted in the flywheel housing 41 is operated by the shaft 141A, which is provided with a conventional throwout yoke to engage the clutch throwout mechanism, the shaft 141A being rotatably mounted in oppositely disposed bosses 142, as disclosed, which form bearing members for the shaft 141A. The lever member 143 is fixedly secured to the shaft 141A and is adapted to turn therewith, the lever member 143 being pivotally connected to the rod 144, which is pivotally connected to the lever member 145, which is an idler lever rotatably mounted on the shaft 138.

The lever member 146 is an idler lever rotatably mounted on the shaft 141A and is pivotally connected to the rod 147, which in turn is pivotally connected to the lever member 148, which is fixedly secured to the shaft 138 and adapted to turn therewith.

In order to operatively connect the clutch and brake mechanism, supported by the frame assembly C, as above described, with the control mechanism mounted on the hinged frame assembly D and its supported body mechanism, I further provide the collars 149, which are fixedly secured respectively on each of the rods 144 and 147 and which are each provided with a spherical or cam surface 151 for engaging the surface of the bent or curved portions 152 of the lever members 153 and 154, which are pivotally mounted on the shaft 155A mounted in the bracket 156A, which in turn is mounted on the frame cross member 16, the lever members 153 and 154 being provided with the forked portions 150, which are adapted to straddle the rods 144 and 147 to allow the bent or curved portions 152 to engage the spherical surfaces 151 of the collars 149 and at the same time to allow the lever members 153 and 154 to move with the auxiliary frame assembly D in its pivotal or hinged movement away from the main frame assembly C.

The brake pedal 155 and the clutch pedal 156 are pivotally mounted on the shaft 157, which is mounted in the bracket 158, which is secured to the frame side rail 12 of auxiliary frame assembly D in a position adjacent the steering gear assembly J and seat structure 69 to permit the driver to engage the pedal pads 159 of the pedals 155 and 156 with his feet, the pedals 155 and 156 thus being moved forward relative to their original positions when the cab units were assembled behind the engine assembly F.

The clutch pedal 156 is pivotally connected at 159A with the rod 160, which is pivotally connected at 161 with the lever member 153. The brake pedal 155 is pivotally connected at 162 with the rod 163, which is pivotally connected at 161 with the lever member 154.

The rod 169 is slidably mounted in and extends through the main floor 56 and is provided with the pad 172, which is adapted to be operated downwardly by the pressure of the foot of the driver operator, the rod 169 being provided with enlarged and rounded end 168 for engaging the lever arm 170 of the bell crank 171, which is pivotally mounted on the shaft 172A, which is suitably supported by the main frame assembly C, the lever arm 172B being pivotally connected with the rod 173 which is suitably connected with the accelerator fuel mechanism of the engine assembly F. The rod 169 is returned to its normal position by the spring 174.

The vehicle shown in Figure 18 discloses a separate cab assembly K installed in conjunction with a tank body 164 mounted on the hinged auxiliary frame assembly D. The vehicle shown in Figure 19 discloses a separate cab assembly K installed in conjunction with a stake body 165 mounted on the hinged auxiliary frame assembly D.

The vehicle shown in Figure 20 discloses a separate cab assembly K installed together with a fifth wheel mechanism 166 on the hinged auxiliary frame assembly D.

The vehicle shown in Figure 21 discloses a separate cab assembly K installed in conjunction with a dump body 167 mounted on the hinged auxiliary frame assembly D.

In operation, the vehicle when equipped with the body assembly E is controlled by a driver operator seated in the seat structure 69, the driver operator controlling the steering movement of the vehicle by means of the steering gear assembly J, the rotation of the steering wheel 70 pivotally moving the steering arm 117, which moves the drag link 119 which pivotally moves the lever member 114 to cause the link 113 to move the steering arm 111 back and forth to steer the wheels 1.

The clutch mechanism G is operatively controlled by the pressure of the foot of the driver operator on the pad 159 of the clutch pedal 156 which pulls the rod 160 forward to move the lever member 153 to engage the collar 149 mounted on the rod 144 and to move the rod 144 forward which in turn pivotally moves the lever 143 to rotate the shaft 141A to operate the clutch mechanism G.

The brake mechanism of the vehicle is operated by the pressure of the foot of the operator on the pad 159 of brake pedal 155, which pulls the rod 163 forward to move the lever member 154 to engage the collar 149 mounted on the rod 147 and to move the rod 147 forward which in turn pivotally moves the lever member 148 to rotate the shaft 138 together with the lever member 141, which causes the thrust shaft 130 to actuate the hydraulic cylinder 131 to cause hydraulic liquid under pressure to flow through the conduit 129 to and operating the brake mechanism in the wheels 1 and 7.

The driver operator controls the operation of the transmission assembly H by means of the gear shift lever 68.

The driver operator enters the body assembly E through the door opening 74 by stepping on the floor 77 of the step compartment 76 and thus up to the main floor 56 and the closing of the door 82 closes the step compartment 76 against entrance of any one when the vehicle is travelling.

The jumper operator stands in the compartment 94 and on the floor 95 while arranging the packages or goods within the body assembly E and when the vehicle stops, the jumper operator opens the door 106 and leaves the vehicle through the door opening. Upon returning after the delivery of the packages or goods, the jumper operator enters the compartment 94 and closes the door 106 and then may arrange the next delivery of packages or goods by traversing the length of the compartment 94 and between the longer stops of the vehicle may be seated on the seat structure 108, the jumper operator always being housed within the body assembly E except when engaged in the actual duty of delivering, the length of the compartment 94 being sufficient to allow the operator to remain either in a standing or seated position in the rear portion of the compartment 94 without obstructing the door opening 97 when the door 106 is open for loading purposes in addition to the rear end doors 88, the railing 109 keeping the compartment 94 free of the goods occupying the main floor 56.

When it is desired to overhaul, inspect, replace, or service in any way the operating units and parts of the vehicle supported by the main frame assembly C, the nuts 38 may be loosened to allow the bolts 32 to be pivotally moved from the brackets 37 after which the floor board 85, together with the hood structure 65 may be removed to provide an open space for the passage of the gear shift lever therethrough when the body assembly E is pivotally moved upward about the shafts 28, the upward movement of the auxiliary frame assembly D together with the body assembly E and their supported parts, such as the hood structure 54, etc. rendering the supported units readily accessible as disclosed in Figure 4. The pivotal upward movement of the body assembly E and the auxiliary frame assembly D and their supported parts will cause the lever members 153 and 154 to pull free from the rods 160 and 163 and in a similar way the end 168 of the rod 169 will move free of the lever arm 170 of the bell crank 171 and also the pivotal downward movement of the above described parts and units will automatically cause said parts to assume their operative positions of engagement. The drag link 119 will pivot the ball end 118 of the lever arm 117 and the ball end 122 of the ball stud 120 when the body assembly E and the auxiliary frame assembly D are pivotally moved upward within a limited range and if greater pivotal movements are required, the front end of the drag link 119 may be readily disconnected.

I claim:

1. In a vehicle provided with a hydraulic brake cylinder together with a brake pedal for operating same, the combination of a main frame assembly, a rock shaft mounted on said main frame assembly, a lever member fixedly mounted on said rock shaft and pivotally connected with said hydraulic brake cylinder, an idler lever pivotally mounted on said main frame assembly, a second lever member fixedly mounted on said rock shaft, a rod member pivotally connected with said second lever member and said idler lever, a collar member fixedly mounted on said rod member, an auxiliary frame assembly pivotally supported on said main frame assembly, and a forked lever member pivotally mounted on said auxiliary frame assembly and adapted to straddle said rod member and engage said collar member, said forked lever being connected with said brake pedal.

2. In a vehicle, the combination of a main frame assembly, a clutch mechanism supported by said main frame assembly, a rock shaft for operating said clutch mechanism, a lever member fixedly supported on said rock shaft, an idler lever pivotally mounted on said main frame assembly, a rod member pivotally connected with said lever member and said idler lever, a collar member fixedly mounted on said rod member, an auxiliary frame assembly pivotally supported on said main frame assembly, a forked lever member pivotally supported on said auxiliary frame assembly and adapted to straddle said rod member and engage said collar member, a clutch pedal pivotally mounted on said auxiliary frame assembly, and a second rod member pivotally connected with said clutch pedal and said forked lever member.

3. In a vehicle provided with an engine assembly, the combination of a main frame assembly supporting said engine assembly, a bell crank pivotally mounted on said main frame assembly, a rod member operatively connected with said bell crank and said engine assembly controlling the latter, an auxiliary frame assembly pivotally connected with said main frame assembly, a plunger member movably supported by said auxiliary frame assembly and adapted to contact and operate said bell crank, and resilient means opposing the movement of said plunger member in one direction.

4. In a vehicle provided with a power developing means for operating a brake mechanism, the combination of a main frame assembly, a rock shaft mounted on said main frame assembly, means connecting said rock shaft with said power developing means, a rod member movably supported by said main frame assembly and connected with said rock shaft, an auxiliary frame assembly movably mounted on said main frame assembly, a leverage mechanism movably mounted on said auxiliary frame assembly, and means for connecting said leverage mechanism with and for operating said rod member to control the operation of said power developing means.

5. In a vehicle provided with a power developing means for operating a brake mechanism, the combination of a main frame assembly, a rock shaft mounted on said main frame assembly and connected with said power developing means, a rod member movably supported and connected with said rock shaft, an auxiliary frame assembly movably mounted on said main frame assembly, a leverage mechanism movably mounted on said auxiliary frame assembly, and means for connecting said leverage mechanism with said rod member to control the operation of said power developing means.

6. In a vehicle provided with a power developing means for operating a brake mechanism, the combination of a main frame assembly, an auxiliary frame assembly pivotally mounted on said main frame assembly, a rock shaft mounted on said main frame assembly and connected with said power developing means, a rod member movably supported and connected with said rock shaft, a lever member pivotally mounted and adapted to engage and move said rod, a pedal member pivotally mounted on said auxiliary frame assembly, and a rod member connecting said pedal and said lever member pivotally mounted on said auxiliary frame assembly.

7. In a vehicle provided with an engine and a clutch mechanism, the combination of a main frame assembly supporting said engine and clutch mechanisms, a lever member supported by said main frame assembly and connected with said clutch mechanism, an idler lever supported by said main frame assembly, a rod member connecting said first mentioned and said idler lever members, an auxiliary frame assembly movably supported by said main frame assembly, a pedal member pivotally supported by said auxiliary frame assembly, a lever member pivotally supported by said auxiliary frame assembly and adapted to engage and move said rod member, and a second rod member connecting said pedal member and said last mentioned lever member.

8. In a vehicle provided with an engine and a clutch mechanism, the combination of a main frame assembly supporting said engine and clutch mechanism, a lever member supported by said main frame assembly and connected with said clutch mechanism, an idler lever supported by said main frame assembly, a rod member connecting said first mentioned and said idler levers supported by said main frame assembly, an auxiliary frame assembly movably supported by said main frame assembly, a pedal member pivotally supported by said auxiliary frame assembly, a forked lever pivotally supported by said auxiliary frame assembly, a second rod member connecting said pedal member and said last mentioned lever member, and a collar member connected with said first rod member and adapted for engagement with said forked lever.

9. In a vehicle, the combination of a main frame structure, an auxiliary frame structure pivotally connected to said main frame structure and adapted to swing in an arc relative thereto, control mechanism mounted on said main frame structure and provided with rod members extending in fore and aft directions, said rod members being provided with shoulder surfaces extending substantially at right angles to the axes of said rod members, and a second control mechanism mounted on said auxiliary frame structure and provided with lever members having curved surfaces adapted to engage said shoulder surfaces of said rod members of said first mentioned control mechanism, the engagement of said curved and said shoulder surfaces enabling said auxiliary frame structure together with said second mentioned control mechanism to swing in an arc relative to said main frame structure and said first mentioned control mechanism.

HUGH JOSEPH DILLON.